(12) United States Patent
Wirola et al.

(10) Patent No.: US 8,078,192 B2
(45) Date of Patent: Dec. 13, 2011

(54) SUPPORTING THE USE OF A VIRTUAL REFERENCE STATION

(75) Inventors: Lauri Wirola, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 498 days.

(21) Appl. No.: 12/148,944

(22) Filed: Apr. 22, 2008

(65) Prior Publication Data

US 2009/0262016 A1    Oct. 22, 2009

(51) Int. Cl.
*H04W 24/00* (2009.01)
(52) U.S. Cl. .................................................. 455/456.1
(58) Field of Classification Search ............. 342/357.08, 342/357.09; 455/456.1
See application file for complete search history.

(56) References Cited

U.S. PATENT DOCUMENTS

| | | | |
|---|---|---|---|
| 4,115,732 A | 9/1978 | Krider et al. | |
| 4,806,851 A | 2/1989 | Krider et al. | |
| 6,741,935 B1 | 5/2004 | Eschenbach | |
| 2004/0203854 A1* | 10/2004 | Nowak | 455/456.1 |
| 2005/0101329 A1* | 5/2005 | Gallagher | 455/436 |
| 2006/0158373 A1 | 7/2006 | Kamei | |
| 2006/0282216 A1* | 12/2006 | Robbins | 701/214 |
| 2008/0150514 A1* | 6/2008 | Codreanu et al. | 324/76.77 |
| 2008/0248809 A1* | 10/2008 | Gower | 455/456.1 |
| 2010/0001903 A1* | 1/2010 | Seatovic et al. | 342/357.09 |

FOREIGN PATENT DOCUMENTS

| | | |
|---|---|---|
| WO | WO 97/05508 | 2/1997 |
| WO | WO 2006/043123 | 4/2006 |
| WO | WO 2007/042600 | 4/2007 |
| WO | PCT/IB2007/051901 | 5/2007 |
| WO | WO 2007/138388 | 12/2007 |
| WO | WO 2008/035139 | 3/2008 |

OTHER PUBLICATIONS

U.S. Appl. No. 11/605,934, filed Nov. 27, 2006, Wirola.
U.S. Appl. No. 11/743,070, filed May 1, 2007, Wirola.
E. Lenz; "Networked Transport of RTCM via Internet Protocol (NTRIP)—Application and Benefit in Modern Surveying Systems"; FIG Working Week, May 27, 2004; pp. 42-47.
H. Hada, et al; "DGPS and RTK Positioning Using the Internet"; GPS Solutions, vol. 4, No. 1, Jul. 2000, pp. 34-44, Abstract , and Figure 4.
G. Weber, et al; "Networked Transport of RTCM via Internet Protocol (Ntrip)—IP-streaming for real-time GNSS applications"; 18th International Technical Meeting of the Satellite Division of the Institute of Navigation, ION GNSS 2005; Sep. 16, 2005; pp. 2243-2247; whole document.

* cited by examiner

*Primary Examiner* — Harry Liu
(74) *Attorney, Agent, or Firm* — Alfred A. Fressola; Ware, Fressola, Van Der Sluys & Adolphson LLP (57) ABSTRACT

For supporting the use of virtual reference stations, an apparatus may receive a request to provide virtual measurements on beacon signals that are valid for a virtual reference station, the request including an indication of a desired location of the virtual reference station. The apparatus may further determine an entity that is associated to an area including the desired location. The apparatus may further cause the request to be forwarded to the determined entity.

22 Claims, 5 Drawing Sheets

SUPPORTING THE USE OF A VIRTUAL REFERENCE STATION

FIELD OF THE INVENTION

The invention relates to the field of positioning, and more specifically to a positioning which is based on measurements on signals that are determined for a virtual reference station.

BACKGROUND OF THE INVENTION

An absolute positioning of a device is supported by various Global Navigation Satellite Systems (GNSS). These include for example the American Global Positioning System (GPS), the Russian Global Navigation Satellite System (GLO-NASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems. The satellites of these systems are also referred to as space vehicles (SV).

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time as well as other biases and measurement errors, such as multipath and delays due to atmosphere.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In a further approach, the carrier phases and/or the code phases measured at two GNSS receivers are evaluated for determining the distance and attitude between the two receivers very accurately, typically at cm- or even mm-level accuracy. The combination of the distance and attitude between two receivers, and thus the vector between these receivers, is also referred to as baseline. The carrier phase measurements that are performed at GNSS receivers may be exchanged in real-time, near real-time or be stored for a later exchange known as post-processing. Usually, one of the GNSS receivers is arranged at a known location and called reference station, while the other receiver is to be positioned with respect to the reference station and called user receiver or rover. The determined relative position can further be converted into an absolute position, if the location of the reference station is accurately known. However, the relative positioning calculations actually require that the positions of both receivers are known at least approximately. These positions can be obtained from determined pseudoranges. Alternatively, it would also be sufficient to know only a reference location approximately, since the rover location can be obtained therefrom by adding the baseline estimate to the reference location.

A satellite signal is distorted on its way from a satellite to a receiver due to, for instance, multipath propagation and due to influences by ionosphere and troposphere. Moreover, the satellite signal has a bias due to the satellite clock bias. All errors that are common to a signal in both receivers can be assumed to correlate between the receivers and satellites, and thus to vanish in double differencing. The same process of double differencing also removes receiver-dependent biases common to all the signals received by the receiver in question. These biases include receiver clock bias.

The relative positioning may thus be based more specifically on signal measurements at two GNSS receivers, which are used to form double difference observables. Such signal measurements may include for example carrier phase measurements and PRN code measurements, etc. A double difference observable relating to the carrier phase is the difference in the carrier phase of a specific satellite signal at both receivers compared to the difference in the carrier phase of another satellite signal at both receivers. A double difference observable relating to the PRN code may be obtained correspondingly. The double difference observables can then be employed for determining the position of the receivers relative to each other at high accuracy.

With conventional GNSS positioning, two GNSS receivers are able to determine their location, and therefore the baseline between them, with an accuracy of 5 to 20 meters. The carrier or code phase based approach, in contrast, allows determining the baseline with a much higher accuracy of 0.1 to 10 cm. It is noteworthy that this accuracy can be achieved with standard commercial GNSS-receivers.

When using the carrier or code phase based approach, however, it has to be considered that a carrier or code phase measured at two receivers is based on different number of whole cycles of the carrier or code. This effect is referred to as double-difference integer ambiguity, which has to be solved. This process is also called integer ambiguity resolution or initialization.

The double-difference integer ambiguity may be resolved by gathering carrier and/or code phase data from a sufficient number of satellites at sufficient measurement instants.

Instead of double-difference integer ambiguities various other ambiguities could be considered and solved as well.

Once the baseline has been determined and the integer ambiguity been resolved, the integer ambiguity solution may be validated in order to determine whether it can be relied on. Integer ambiguity validation is typically done using statistical tools.

The solved and validated integer ambiguities may then be used for tracking the baseline between the receivers at high precision, for instance with a sub-cm accuracy.

The carrier phase measurement performed by a GNSS receiver on a GNSS signal originating from a GNSS space vehicle is also called 'accumulated delta range (ADR) measurement' or 'integrated Doppler measurement'.

Originally, carrier phase based positioning was only available for geodesic surveying and other applications requiring high accuracy. The equipment required for such applications is expensive and meant, therefore, only for professional use. In these cases, the baseline is moreover often determined off-line. However, it is also possible to obtain a high-precision baseline using two low-cost GNSS-enabled handsets, for example terminals with integrated GNSS-receiver or terminals equipped with an external Bluetooth GNSS-receiver. The data between the terminals can be exchanged using any kind of data transfer technology, like general packet radio service (GPRS), wireless local area networks (WLAN) or Bluetooth™. This allows the baseline to be determined and updated in real-time or near real-time. This approach is also called mobile Real-Time Kinematics (mRTK), indicating that mobile technology is used to expand the carrier-phase based use cases and bring the benefits of the technology to a wider audience.

Instead of a second handset, the reference station could also be for instance a location measurement unit (LMU) of a network or a virtual reference station (VRS) for which the required measurement data is provided.

When using a virtual reference station, a baseline is determined between the rover and a computationally produced station. This allows performing a relative positioning with only one physical receiver. Moreover, the absolute position of the virtual reference station is known accurately and, hence, also that of the rover once the baseline is solved. The relative positioning calculation for a physical receiver and a virtual reference station are the same as the relative positioning calculation for two physical receivers.

Virtual reference stations can be generated at any desired location and thus always close to the current location of the device which is to be positioned. The use of a virtual reference station thus facilitates as well the use of a short baseline between a rover and a reference station, which in turn improves the reliability and speed of a baseline determination. Further, a short baseline may allow neglecting unknown terms representing troposphere delay and ionosphere advance in integer ambiguity resolution.

Service providers which provide measurements for virtual reference stations generate virtual reference stations locally for a certain geographical area, usually for professional use.

SUMMARY OF SOME EMBODIMENTS OF THE INVENTION

A method is described, which comprises receiving a request to provide virtual measurements on beacon signals that are valid for a virtual reference station, the request including an indication of a desired location of the virtual reference station. The method further comprises determining an entity that is associated to an area including the desired location. The method further comprises causing the request to be forwarded to the determined entity.

Moreover, an apparatus is described, which comprises a processor. The processor is configured to receive a request to provide virtual measurements on beacon signals that are valid for a virtual reference station, the request including an indication of a desired location of the virtual reference station. The processor is further configured to determine an entity that is associated to an area including the desired location. The processor is further configured to cause the request to be forwarded to the determined entity.

An apparatus may comprise for example exclusively the described processor, but it may also comprise additional components. The apparatus could further be for example a module provided for integration into a device, like a processing component, a chip or a circuit implementing the processor, or it could be such a device itself, like a server or a network element.

Moreover, an apparatus is described, which comprises means for receiving a request to provide virtual measurements on beacon signals that are valid for a virtual reference station, the request including an indication of a desired location of the virtual reference station, means for determining an entity that is associated to an area including the desired location, and means for causing the request to be forwarded to the determined entity.

The means of this apparatus can be implemented in hardware and/or software. They may comprise for instance a processor for executing computer program code for realizing the required functions, optionally in combination with a memory storing the program code. Alternatively, they could comprise for instance a circuit that is designed to realize the required functions, for instance implemented in a chipset or a chip, like an integrated circuit.

Moreover, an arrangement is described, which comprises any of the described apparatuses and a plurality of entities associated to a respective area.

Moreover, a computer readable storage medium is described, in which computer program code is stored. The computer program code realizes the described method when executed by a processor. The computer readable storage medium could be for example a disk or a memory or the like. The computer program code could be stored in the computer readable storage medium in the form of instructions encoding the computer-readable storage medium. It is to be understood that also the computer program code by itself has to be considered an embodiment of the invention.

Finally, a method is described, which comprises providing access to a plurality of service providers, which offer virtual measurements on beacon signals that are valid for virtual reference stations, via a single access point.

Thus, certain embodiments of the invention support an indirect access to a virtual reference station service in that a request for such a service received at one entity may be forwarded to an appropriate other entity. The criterion for the selection of an entity, to which the request is to be forwarded, may be given by a location at which the virtual reference station is to be generated, while corresponding information may be provided in the request. Each selectable entity may be associated to a specific area, and an entity may be selected in case the indicated location lies in the associated area. The selected entity to which the request is forwarded may be for example an entity providing the desired service itself, or it may be for example an entity forwarding the request to a further entity, until the request reaches an entity providing the actual service.

In one embodiment of the described methods, the method is carried out at an apparatus that is equally associated to an area including the location, and the area to which the determined entity is associated is a sub-area of the area to which the apparatus is associated. In a corresponding embodiment of one of the described apparatuses, the apparatus is associated to an area including the location, and the processor or some other means is configured to determine an entity that is associated to a sub-area of the area to which the apparatus is associated. In the case of an embodiment of the described computer readable storage medium, the computer program code may be associated to an area including the location, and the area to which the determined entity may be associated is a sub-area of the area to which the computer program code is associated.

In one embodiment of the described methods, the method further comprises causing a transmission of access information for an entity, which is configured to provide virtual measurements on beacon signals that are valid for a virtual reference station in an area comprising the desired location, in direction of a device from which the request originates. In a corresponding embodiment of one of the described apparatuses, the processor or some other means is configured to cause a transmission of access information for an entity, which is configured to provide virtual measurements on beacon signals that are valid for a virtual reference station in an area comprising the desired location, in direction of a device from which the request originates.

In one embodiment of the invention, the requested virtual measurements on beacon signals comprise carrier-phase measurements on beacon signals. Carrier phase measurements can be used for obtaining observables, which allow tracking a baseline between a beacon signal receiver and the virtual reference station, once integer ambiguities have been solved. It is to be understood, however, that alternatively or in addition, other kinds of measurements that are valid for a virtual reference station may be provided as well, including for example code-phase measurements.

In one embodiment of the described apparatuses, the apparatus comprises an interface configured to enable at least one of a reception of the request and a forwarding of the request. The interface can be for example an interface supporting a wired or wireless access to the Internet, or to any other link to another entity.

In one embodiment of the described apparatuses, the apparatus comprises a memory or other means configured to store access information for entities that are associated to a respective area. The processor or some other means is configured to access the memory for determining an entity that is associated to an area including the desired location. The memory may be configured to store in addition for an entity, for which access information is stored, an identification of an area to which the entity is associated. The identification can be of any kind, for instance map data or a circle, rectangle or other structure of variable or fixed size, defined for example by a center point.

In one embodiment of the described arrangements, the plurality of entities comprise a plurality of positioning servers, each positioning server being configured to generate a virtual reference station for a desired location in a predetermined area and to provide virtual measurements on beacon signals that are valid for the virtual reference station.

In a further embodiment of the described arrangements, the plurality of entities comprises a plurality of intermediate entities, each intermediate entity corresponding to an embodiment of one of the described apparatuses.

In embodiments of the described computer readable storage medium, the computer program code may realize any of the described embodiments of a method when executed in a processor.

For one embodiment of the invention, moreover an information providing method is described, which comprises the actions (steps) of receiving a request to provide virtual measurements on beacon signals that are valid for a virtual reference station, the request including an indication of a desired location of the virtual reference station, determining an entity that is associated to an area including the desired location, and causing the request to be forwarded to the determined entity.

For a further embodiment of the invention, moreover an information providing apparatus is described, which comprises receiving means for receiving a request to provide virtual measurements on beacon signals that are valid for a virtual reference station, the request including an indication of a desired location of the virtual reference station, determining means for determining an entity that is associated to an area including the desired location, and forwarding means for causing the request to be forwarded to the determined entity.

In one embodiment of the invention, any of the described apparatuses can be seen as a request forwarding apparatus.

Virtual measurements that are valid for a respective virtual reference station can be requested for example by a device including a beacon signal receiver which is to be positioned or by a device which is linked to a device including a beacon signal receiver. The request could then include an indication of a current rough or precise position of the device including the beacon signal receiver as the desired location of the virtual reference station.

The requested virtual measurements may be used in different ways.

In one embodiment, the virtual measurements may be stored together with data including measurements on beacon signals received by a beacon signal receiver. The stored data may then be used in a post-processed at any desired location, for example locally or at a network server.

In another embodiment, the virtual measurements may be used for example in a real time or near real time positioning of a device including a beacon signal receiver.

The invention can be employed for example in high-precision navigation and surveying applications. It can be provided for professional use, but also for fun applications, such as writing with a GNSS receiver.

The invention can further be used for any kind of beacon signals, in particular, though not exclusively, for satellite signals. Such satellite signals may comprise satellite signals transmitted in a GNSS, like GPS, GLONASS, GALILEO, SBAS, QZSS, LAAS or a combination of these. LAAS makes use of pseudolites instead of true satellites, but these pseudolites are to be understood to be covered as well by the term satellite as used in this application. LAAS has the advantage that it enables a positioning under indoor conditions as well.

It is to be understood that any feature presented for a particular exemplary embodiment may also be used in combination with any other described exemplary embodiment.

Further, it is to be understood that the presentation of the invention in this section is merely exemplary and non-limiting.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
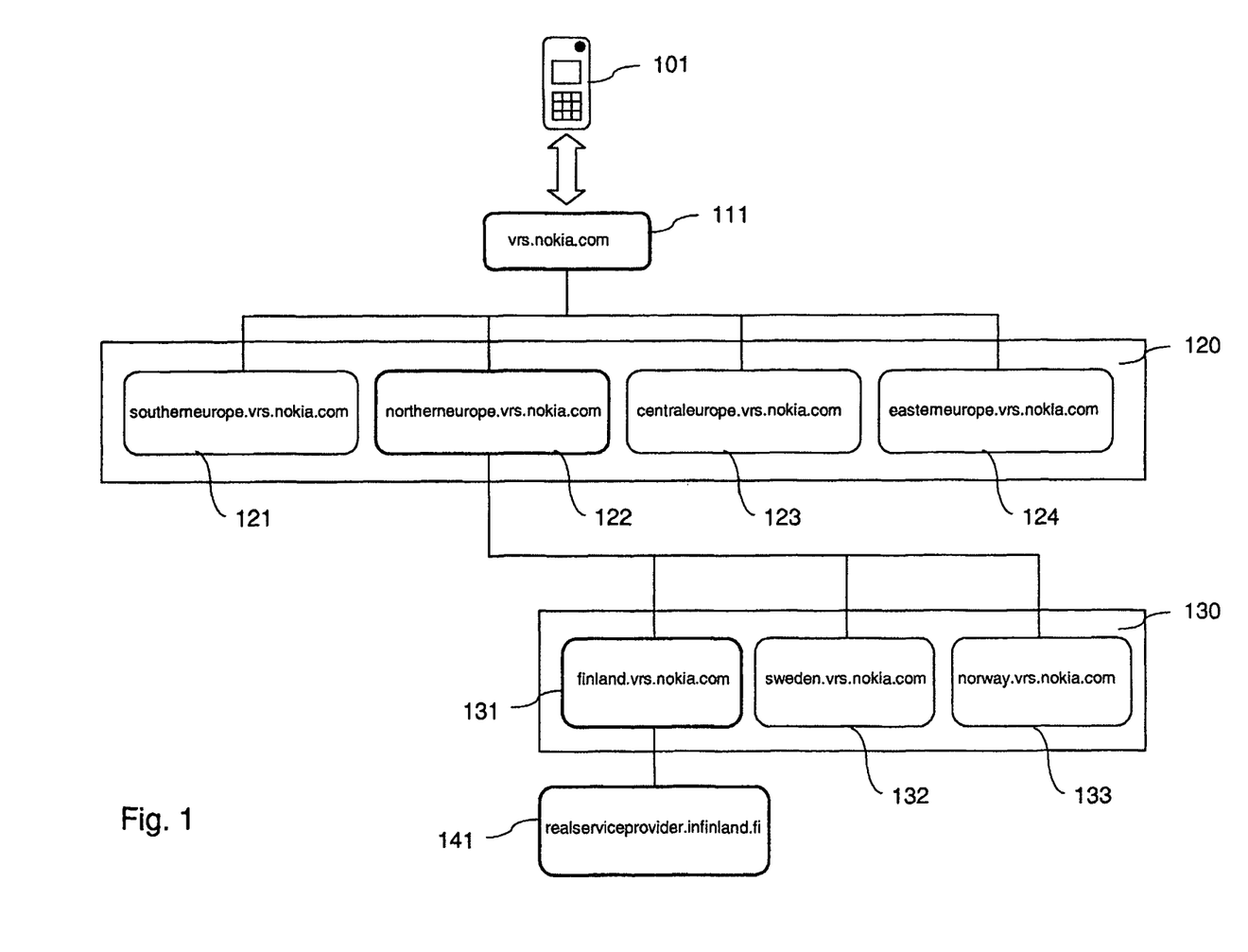
FIG. 1 is a diagram schematically illustrating a system including an arrangement according to an exemplary embodiment of the invention.

FIG. 1 is a schematic diagram of an exemplary system which supports a high-precision navigation using virtual reference stations.

The system comprises a wireless communication terminal 101 and a distributed server architecture as an exemplary embodiment of an arrangement.

The terminal 101 is able to access a common mount point for a virtual reference station service in Europe. The common mount point is provided by a server 111. The server 111 may have for example the name "vrs.nokia.com" and be associated to an area covering all of Europe. As a common mount point, it provides an access for all terminals that wish to make use of a virtual reference station service in Europe.

The terminal 101 may access this server 111 for example via a wireless access arrangement and the Internet using the name of the server 111. The wireless access arrangement could be any network or a single server providing on the one hand a wireless access and on the other hand a link to the Internet. Examples for such a wireless access arrangement could be a cellular communication network or a WLAN, etc.

The server 111 is logically linked to each of a plurality of sub-servers 121 to 124 of a first sub-layer 120. Server 121 may have for example the name "southerneurope.vrs.nokia.com" and be associated to an area covering southern Europe. Server 122 may have for example the name "northerneurope.vrs.nokia.com" and be associated to an area covering northern Europe. Server 123 may have for example the name "centraleurope.vrs. nokia.com" and be associated to an area covering central Europe. Server 124 may have for example the name "easterneurope.vrs.nokia.com" and be associated to an area covering eastern Europe.

Each of the servers 121 to 124 is logically linked to a plurality of sub-servers of a second sub-layer 130. Server 121, for example, may be logically linked to each of a plurality of sub-servers 131 to 133. Server 131 may have for example the name "finland.vrs.nokia.com" and be associated to an area covering Finland. Server 132 may have for example the name "sweden.vrs.nokia.com" and be associated to an area covering Sweden. Server 133 may have for example the name "norway.vrs.nokia.com" and be associated to an area covering Norway.

Each of the servers 131 to 133 is logically linked to the server of at least one service provider actually providing measurements for a virtual reference station in a specific area. Server 131, for example, may be logically linked to real service provider server 141. Server 141 may have for example the name "realserviceprovider.infinland.fi".

A communication between the servers 111 to 141 can be realized via the Internet, but equally via any other desired link.

It is to be understood that the number of sub-layers, the number of servers in each sub-layer and the association to covered areas could be selected arbitrarily in any manner. Further, a similar structure could be provided for any other area than Europe, and the common mount point could be provided for any area smaller than, larger than or overlapping with the area of Europe as well. It would even be possible to provide a common mount point for the entire surface of Earth in general.

Figure 2:
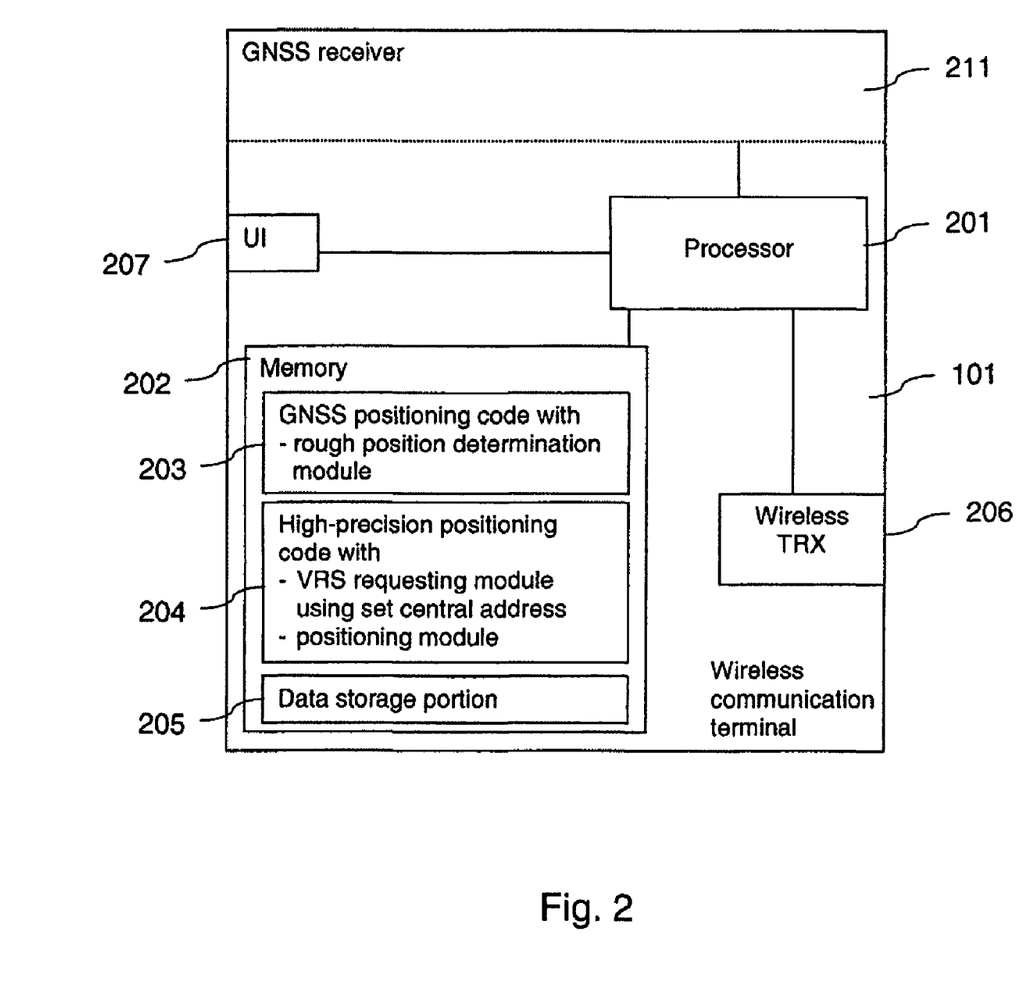
FIG. 2 is a schematic block diagram of an exemplary wireless communication terminal in the system of FIG. 1.

FIG. 2 presents an exemplary embodiment of the wireless communication terminal 101.

The wireless communication terminal 101 can be for instance a mobile phone or a laptop, but equally any other device of which a position might have to be determined. The terminal 101 comprises a processor 201 and, linked to this processor 201, a memory 202, a transceiver (TRX) 206 and a user interface (UI) 207.

The processor 201 is further linked to a GNSS receiver 211. The GNSS receiver 211 may be integrated in the terminal 101. Alternatively, though, it could also be or belong to an accessory device that is connected to the terminal 101. This option is indicated in FIG. 2 by a dotted line between the GNSS receiver 211 and the other components of terminal 101. A GNSS accessory device could be connected to the user device 101 via any suitable link, like a physical connection or a Bluetooth™ link, etc.

The processor 201 is configured to execute implemented computer program code. The memory 202 stores computer program code, which may be retrieved by the processor 201 for execution. The stored program codes comprise a GNSS positioning code 203, which includes a functional module for a conventional rough GNSS based positioning. The stored program codes further comprise a high-precision positioning code 204, which includes functional modules for requesting VRS measurements and for performing the actual high-precision positioning. The memory 202 further provides a data and settings storage portion 205, which can equally be accessed by the processor 201.

It is to be understood that some functions realized by the processor 201 could be realized in an alternative embodiment for example by the GNSS receiver 211.

The transceiver 206 enables a communication via a wireless link with other devices. The transceiver 206 could belong for instance to a cellular engine of the terminal 101 and support an access to a cellular communication network, or it could belong to a WLAN engine of the terminal 101 and support an access to a WLAN. Alternatively, the transceiver 206 could also enable for example a wireless link to a stand-alone server using any known technology.

The user interface 207 may provide input and/or output functionality. It could comprise for example keys, a touchpad, a display, loudspeakers, etc.

Figure 3:
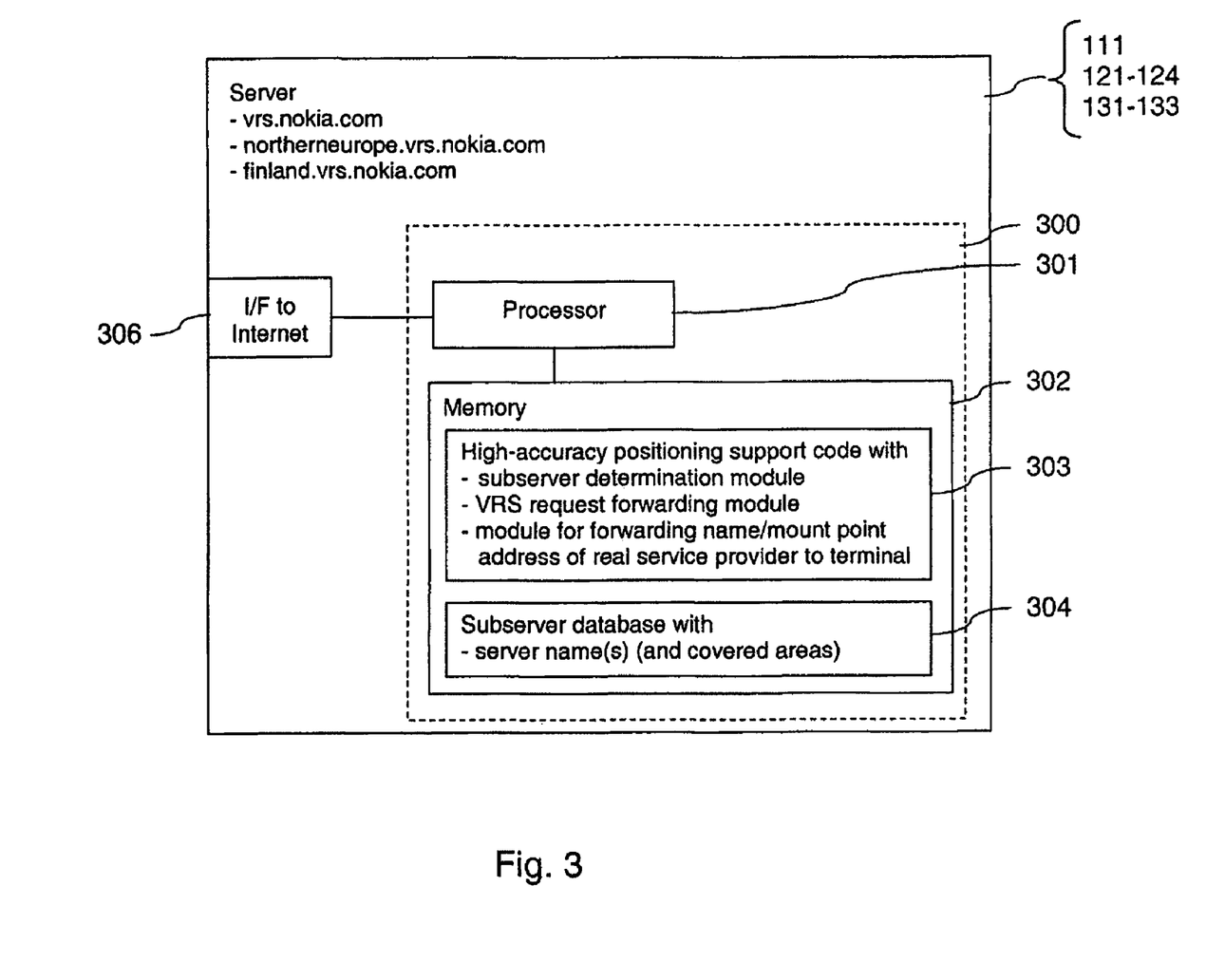
FIG. 3 is a schematic block diagram of an exemplary central server or an exemplary sub-server in the system of FIG. 1.

FIG. 3 presents an exemplary embodiment of any of the servers 101 to 133.

These servers comprise a processor 301 and, linked to this processor 301, a memory 302 and an interface 306. The processor 301 and the memory 302 could optionally be integrated in a single component 300 illustrated in FIG. 3 by dashed lines, for example on a chip.

The processor 301 is configured to execute implemented computer program code. The memory 302 stores computer program code, which may be retrieved by the processor 301 for execution. The stored computer program codes comprise a high-accuracy positioning support code 303, including a functional module for determining a respective sub-server, a functional module for forwarding a received virtual reference station service request to a sub-server, and a functional module for forwarding a server name and/or IP address of the server of a real service provider to a terminal. The memory 302 stores in addition a sub-server database 304. The database 304 includes the names and/or IP addresses of at least one sub-server. At least in case information on more than one sub-server is stored, the database 304 associates to each sub-server a respective area to which the sub-server is associated.

The database 304 of the server 111 "vrs.nokia.com", for example, associates the names "southerneurope.vrs.nokia.com", "northerneurope.vrs.nokia.com", "centraleurope.vrs.nokia.com", and "easterneurope.vrs.nokia.com" to an indication of a respective geographic area.

The database 304 of the server 122 "northerneurope.vrs.nokia.com", for example, associates the names "finland.vrs.nokia.com", "sweden.vrs.nokia.com" and "norway.vrs.nokia.com" to an indication of a respective geographic area.

The database 304 of the server 131 "finland.vrs.nokia.com", for example, stores the name "realserviceprovider.in-finland.fi". It may also store the names of further real service provider servers in Finland. In this case, a respective indication of a geographic area is associated to each name as well.

The indication of an area can define the area in any suitable manner. It could be for instance in the form of a map, which allows determining whether a location defined by latitude and longitude lies in the area.

The interface 306 enables the processor 301 to be accessed via the Internet and to access other servers via the Internet.

Figure 4:
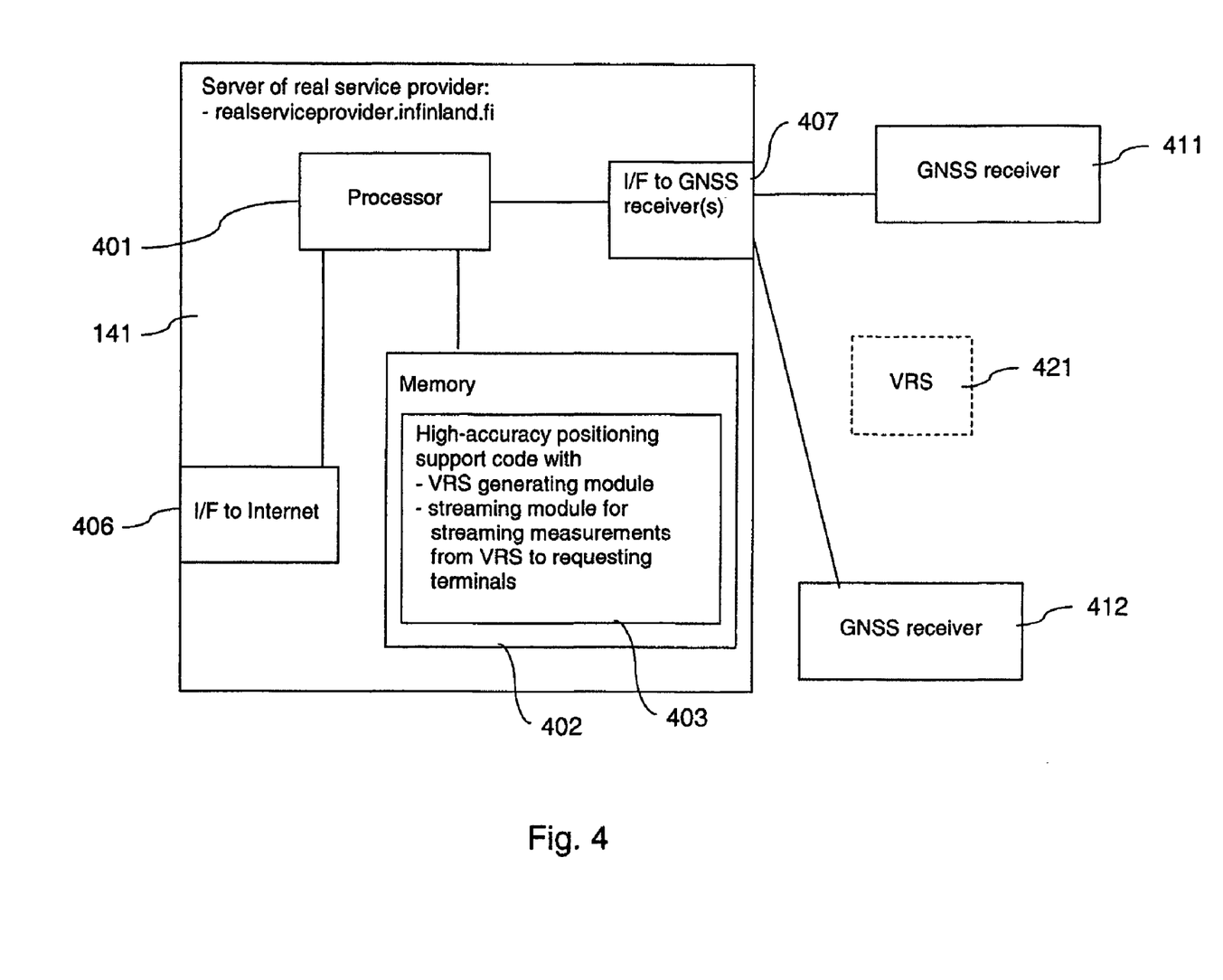
FIG. 4 is a schematic block diagram of an exemplary server of a real service provider in the system of FIG. 1.

FIG. 4 presents an exemplary embodiment of the server 141 of a real service provider.

The server 141 is responsible for providing the actual service of generating virtual reference stations and of providing associated measurements to a requesting entity.

The server 141 comprises a processor 401 and, linked to this processor 401, a memory 402, an interface 406 and an interface 407.

The processor 401 is configured to execute implemented computer program code. The memory 402 stores computer program code, which may be retrieved by the processor 401 for execution. The stored computer program codes comprise a high-accuracy positioning support code 403, including functional modules for generating virtual reference stations and for streaming measurements for virtual reference stations.

The interface 406 enables the processor 401 to be accessed via the Internet and to stream measurements via the Internet.

The interface 407 enables the processor 401 to communicate with one or more GNSS receivers. The number of GNSS receivers is not limited and could comprise tens or hundreds of GNSS receivers, depending on the coverage and precision that a virtual reference station service provider wishes to obtain.

FIG. 4 shows by way of example two such GNSS receivers 411 and 412. The GNSS receivers 411, 412 are both configured to operate as normal GNSS receivers. That is, they are configured to receive, acquire, track and decode signals transmitted by satellites belonging to one or more GNSSs, like GPS and Galileo. Each GNSS receiver 411, 412 comprises an antenna for receiving satellite signals, which has a reference point at an accurately known position. One of the GNSS receivers could also be integrated in the server 141. A GNSS receiver could also belong to a separate device, like location measurement unit (LMU) that is connected to the server 141 via interface 407. A GNSS receiver or a location measurement unit could be connected to the server 141 using any suitable link, for example a wired link.

It is to be understood that some functions realized by the processor 401 could be realized in an alternative embodiment for example by the GNSS receivers 411, 412.

The GNSS receiver 211 of the wireless communication terminal 101 is equally configured to operate as normal GNSS receivers. That is, it is configured to receive, acquire, track and decode signals transmitted by satellites belonging to one or more GNSSs, like GPS and Galileo. Based on the navigation information in the decoded signals and on measurements on the received signals, processor 201 is further able to compute a rough position of an antenna reference point of GNSS receiver 211 in a known manner using program code 203.

For a particular application, however, the position of the antenna reference point of GNSS receiver 211 might have to be determined with high precision. To this end, an enhanced high-accuracy positioning is employed, which is illustrated in the flow chart of FIG. 5.

Figure 5:
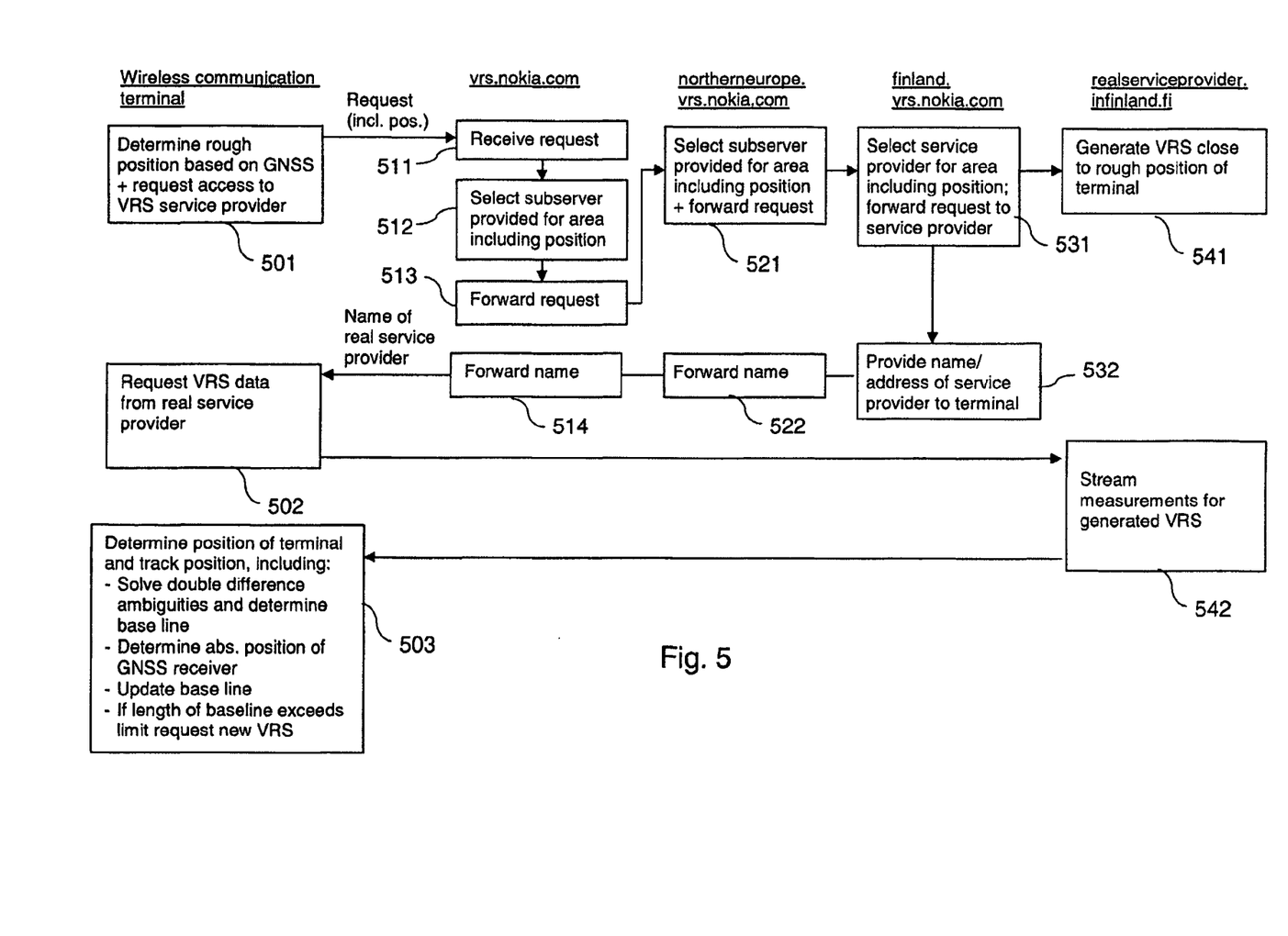
FIG. 5 is a flow chart illustrating an exemplary operation in the system of FIG. 1.

The high-accuracy positioning can be initiated for instance by a user of terminal 101 via user interface 207, which causes the processor 201 to executed program code 204.

Using computer program code 203, which may be called by program code 204, the processor 201 of terminal 101 determines at first a rough position estimate of the GNSS receiver 211 based on navigation information in satellite signals received by this receiver 211. Using computer program code 204, the processor 201 of terminal 101 further generates a request for virtual reference station measurements, which is transmitted to server 111 as a common mount point for virtual reference station services in Europe (step 501). The name "vrs.nokia.com" of the server 111 may be integrated in computer program code 204 itself or be stored as a setting in data and settings storage portion 205. The request includes an indication of the rough position estimate. In addition, the request may indicate the type of signals for which virtual reference station measurements are desired. Moreover, GNSS receiver 211 is requested by processor 201 to provide carrier-phase measurements on all visible satellites.

The processor 301 of server 111 receives the request via interface 306 (step 511). Using the sub-server determination module of program code 303, the processor 301 determines a sub-server that is suitable for the indicated position (step 512). To this end, it searches in database 304, whether the indicated position is included in one of the geographic areas indicated in database 304. For example, in case the position lies in Finland, the processor 301 will find that the position lies in the indicated area of northern Europe. The processor 301 then determines the sub-server name that is associated in the database 304 to this area. In the example of a position in Finland, the associated sub-server name is "northerneurope.vrs.nokia.com" of server 122. Using the virtual reference station request forwarding module of program code 303, the processor 301 forwards the received request via interface 306 to determined sub-server 122 using the determined sub-server name (step 513).

The processor 301 of server 122 receives the request via interface 306. Using program code 303, the processor 301 determines a sub-server that is suitable for the indicated position. To this end, it searches in database 304, whether the indicated position is included in one of the geographic areas indicated in database 304. For example, in case the position lies in Finland, the processor 301 will find that the position lies in the indicated area of Finland. The processor 301 then determines the sub-server name that is associated in the database 304 to this area. In the example of a position in Finland, the associated sub-server name is "finland.vrs.nokia.com" of server 131. The processor 301 forwards the received request via interface 306 to server 131 using the determined server name. (step 521)

The processor 301 of server 131 receives the request via interface 306. Using program code 303, the processor 301 determines the name of a real service provider server that is suitable for the indicated position. To this end, it searches in database 304, whether the indicated position is included in one of the indicated areas, if any. For example, in case there is only a single real service provider server for Finland, the position is assumed to be included in the area covered by this server. Otherwise, a sub-server covering the area including the indicated position is selected. In the present example, there may be only one real service provider server for Finland, namely the server 141 "realserviceprovider.infinland.fi". The processor 301 forwards the received request via interface 306 to server 141 using the determined server name. (step 531)

The processor 401 of the server 141 of the real service provider receives the request via interface 406. Using the virtual reference station generating module of program code 403, the processor 401 generates a virtual reference station VRS 421 at the location of the received rough position estimate. For the generation of the VRS 421 the program code 403 uses the information from all the GNSS receivers (411 and 412 in this example) in the network of GNSS receivers. Alternatively, a subset of the GNSS receivers in the network may be utilized in the generation of the VRS 421.

In parallel, the processor 301 of server 131 uses the forwarding module of program code 303 for transmitting the determined name "realserviceprovider.infinland.fi" of the real service provider server 141 via server 122 and server 111 to the requesting terminal 101 (steps 532, 522, 512). In each of these servers 122 and 111, the processor 301 uses a corresponding forwarding module of program code 303 to this end.

The processor 201 of terminal 101 receives the name "realserviceprovider.infinland.fi" of the real service provider server 141 via transceiver 206. Still using the virtual reference station requesting module of computer program code 204, the processor 201 may now request the desired virtual reference station data directly from the real service provider server 141 to reduce the processing load on the common mount point server 111 and the intermediate servers 122 and 131 (step 502).

Upon receipt of the direct request from the terminal 101, the processor 401 of server 141 uses the streaming module of program code 403 for streaming the determined virtual code-phase and carrier-phase measurements via interface 406 to the terminal 101 in assembled messages (step 542). The provided messages may further include other information. For example, the message might contain a time-stamp for the measurements in indicated GNSS time. In case the virtual reference station is not generated exactly at a location corresponding to the position estimate for the GNSS receiver 211, such additional information may also comprise the accurate location of the virtual reference station 421.

The processor 201 of the terminal 101, which receives the messages from the server 141 via transceiver 206, is now able to perform relative positioning computations using double difference observations by executing the positioning module of computer program code 204 (step 503). The double difference observations are formed from the carrier phase measurements received from the server 141 for the virtual reference station 421 and the carrier phase measurements received from GNSS receiver 211. In some cases it may also be advantageous to form double difference observables for code phase measurements.

The relative positioning computations aim at solving the double-difference integer ambiguities. The problem formulation may lead to the following exemplary measurement equation:

$$\phi_{kr}^{pq} = \rho_{kr}^{pq} + \lambda N_{kr}^{pq} + \epsilon_{kr}^{pq}, \tag{1}$$

where $\phi_{kr}^{pq}$ is the double difference observable defined by $\phi_{kr}^{pq} = (\phi_k^p - \phi_r^p) - (\phi_k^q - \phi_r^q)$, where $\phi_k^p$, $\phi_r^p$, $\phi_k^q$, $\phi_r^q$ are the available carrier phase measurements by the reference station k (VRS) and the rover r (GNSS receiver 211) of the signals originating from the satellites p and q.

Moreover, $\rho_{kr}^{pq}$ is the difference of geometric ranges defined by $$\begin{aligned}\rho_{kr}^{pq} &= (\rho_k^p - \rho_r^p) - (\rho_k^q - \rho_r^q) \\ &= (\|x^p - \underline{x_k}\| - \|x^p - (\underline{x_k} - \underline{b})\|) - (\|x^q - \underline{x_k}\| - \|x^q - (\underline{x_k} - \underline{b})\|)\end{aligned} \tag{2}$$

where $x^p$ and $x^q$ are the known positions of the satellites p and q, respectively. $x_k$ is the known position of the reference station (VRS) and $\underline{b} = x_k - x_r$ is the unknown baseline to be determined. Finally, $\lambda$, $N_{kr}^{pq}$ and $\epsilon_{kr}^{pq}$ are the wavelength, unknown double difference ambiguity (note that $N_{kr}^{pq} \in \aleph$) and double-difference measurement noise, respectively.

It has to be noted that a time variable has been omitted from the equations for the sake of clarity. However, accounting for different measurement instants and time-of-flight differences between the receivers may be required for a determination of the baseline. Further, it has to be noted that presented equation (1) represents a simplified form of a measurement equation, which may be modified and extended in various ways.

Solving equation (1), which can be realized with any suitable approach, yields the fixed baseline estimate $\underline{b}$ and double-difference ambiguities $\underline{N}$.

As mentioned above, using double differences has the advantage that double differencing errors that are common to a given satellite signal in two receivers cancel out.

Examples for such common errors comprise satellite clock bias as well as errors induced by the troposphere and the ionosphere.

It is to be understood, however, that any other kind of observables and corresponding ambiguities could be used as well, including but not limited to single and triple difference observables and integer ambiguities.

Finally, the processor 201 may determine an accurate absolute position of the GNSS receiver 211, or more specifically of its antenna reference point, by subtracting the baseline vector from the available accurate co-ordinates of the virtual reference station 421.

An indication of the absolute position of the GNSS receiver 211 may be presented for example to a user via user interface 207.

The processor 201 may check whether the length of the determined baseline exceeds a predetermined length. As long as this is not the case, the processor 201 may track changes in the baseline at high precision using the solved double difference integer ambiguities and new carrier-phase measurements and update the absolute position of GNSS receiver 211 accordingly. When the processor 201 determines, however, that the length of the determined baseline exceeds a predetermined length, it may request measurements for a new virtual reference station from the common mount point server 111 proceeding with step 501. The request includes the current position of the GNSS receiver 211.

It is to be understood that it is not required that the positioning computations are carried out in real-time. Alternative, the processor 201 could store the received carrier-phase measurements together with associated carrier-phase measurements from the GNSS receiver 211 in data and settings storage portion 205 for enabling a post processing in the terminal 101 or at an external entity.

It is thus an advantage of some embodiments of the invention that they allow forming a distributed architecture for directing a request for a virtual reference station service to an appropriate service provider, an example being presented with reference to FIG. 1.

In some embodiments, there could be a single common mount point for a virtual reference station service by different service providers, and a request is trickled down to the actual service provider. This reduces system complexity significantly and enables a terminal to access a virtual reference station service always via the same common mount point, like server 111 in the example presented with reference to FIG. 1.

Some embodiments of the invention may also be very flexible for upgrades and reconfigurations, and new geographical areas can be added without complications. A change in the arrangement does also not require any changes in the user terminals as the common mount point may always be the same. In the example presented with reference to FIG. 1, only the content of the respective database 304 of servers 111 to 133 might be updated when a new geographical area is to be added or when a service provider is to be replaced.

In some embodiments, the sub-servers can be set up differently depending on the expected load in a geographical area. For example, the server pool for highly populated areas could be much larger than the server or server pool for rural areas. Also, the distributed sub-server architecture will make the service much more reliable and more tolerant against failures.

It is to be understood that any presented connection is to be understood in a way that the involved components are operationally coupled. Thus, the connections can be direct or indirect with any number or combination of intervening elements, and there may be merely a functional relationship between the components.

Further, any of the mentioned processors could be of any suitable type, for example a computer processor, field-programmable gate arrays, an application-specific integrated circuit (ASIC), etc. Any of the mentioned memories could be implemented as a single memory or as a combination of a plurality of distinct memories, and may comprise for example a read-only memory, a flash memory or a hard disc drive memory, etc. Furthermore, any other hardware components that have been programmed in such a way to carry out the described functions could be employed as well.

Moreover, any of the actions (steps) described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as field-programmable gate arrays, application-specific integrated circuits (ASICs), signal processing devices, and other devices.

The functions illustrated by the processor 301 of any of servers 111, 121-124 and 131-133 executing program code 303 can be viewed as means for receiving a request to provide virtual measurements on beacon signals that are valid for a virtual reference station, the request including an indication of a desired location of the virtual reference station, means for determining an entity that is associated to an area including the desired location, and means for causing the request to be forwarded to the determined entity. Alternatively, the functions illustrated by the functional modules of the program code 303 of any of servers 111, 121-124 and 131-133 can be viewed as such means.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method actions (steps) which perform substantially the same function in substantially the same way to achieve the same results are within the scope of the invention. Moreover, it should be recognized that structures and/or elements and/or method actions (steps) shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   receiving, by an apparatus, a request to provide virtual measurements on beacon signals that are valid for a virtual reference station, the request including an indication of a desired location of the virtual reference station;
   determining, by the apparatus, an entity that is associated to an area including the desired location; and
   causing, by the apparatus, the request to be forwarded to the determined entity.

2. The method according to claim 1, wherein the method is carried out at an apparatus that is associated to an area including the location and wherein the area to which the determined entity is associated is a sub-area of the area to which the apparatus is associated.

3. The method according to claim 1, further comprising:
   causing a transmission of access information for an entity, which is configured to provide virtual measurements on beacon signals that are valid for a virtual reference station in an area comprising the desired location, to a device from which the request originates.

4. The method according to claim 1, wherein the requested virtual measurements on beacon signals comprise carrier-phase measurements on beacon signals.

5. An apparatus comprising a processor and at least one memory including computer program code, the at least one memory and the computer program code configured to, with the processor, cause the apparatus at least to perform:
   receive a request to provide virtual measurements on beacon signals that are valid for a virtual reference station, the request including an indication of a desired location of the virtual reference station;
   determine an entity that is associated to an area including the desired location; and
   cause the request to be forwarded to the determined entity.

6. The apparatus according to claim 5, wherein the apparatus is associated to an area including the location and wherein the at least one memory and the computer program code are configured to, with the processor, cause the apparatus to determine an entity that is associated to a sub-area of the area to which the apparatus is associated.

7. The apparatus according to claim 5, wherein the at least one memory and the computer program code are configured to, with the processor, cause the apparatus to cause a transmission of access information for an entity, which is configured to provide virtual measurements on beacon signals that are valid for a virtual reference station in an area comprising the desired location, to a device from which the request originates.

8. The apparatus according to claim 5, wherein the requested virtual measurements on beacon signals comprise carrier-phase measurements on beacon signals.

9. The apparatus according to claim 5, further comprising an interface configured to enable at least one of a reception of the request and a forwarding of the request.

10. The apparatus according to claim 5, further comprising a memory configured to store access information for entities that are associated to a respective area, wherein the at least one memory including the computer program code and the computer program code are configured to, with the processor, cause the apparatus to access the memory which is configured to store access information for determining an entity that is associated to an area including the desired location.

11. The apparatus according to claim 10, wherein the memory configured to store access information is configured to store in addition for an entity for which access information is stored an identification of an area to which the entity is associated.

12. The apparatus according to claim 5, wherein the apparatus is one of a processing component, a chip, a circuit, a server and a network element.

13. An arrangement comprising:
an apparatus according to claim 5; and
a plurality of entities associated to a respective area.

14. The arrangement according to claim 13, wherein the plurality of entities comprise a plurality of positioning servers, each positioning server being configured to generate a virtual reference station for a desired location in a predetermined area and to provide virtual measurements on beacon signals that are valid for the virtual reference station.

15. The arrangement according to claim 13, wherein the plurality of entities comprise a plurality of intermediate entities, each intermediate entity including a processor and at least one memory including computer program code, the at least one memory and the computer program code configured to, with the processor, cause the intermediate entity at least to perform,
receive a request to provide virtual measurements on beacon signals that are valid for a virtual reference station, the request including an indication of a desired location of the virtual reference station;
determine another entity that is associated to an area including the desired location; and
cause the request to be forwarded to the determined other entity.

16. A computer readable storage medium in which computer program code is stored, the computer program code realizing the following when executed by a processor:
receiving a request to provide virtual measurements on beacon signals that are valid for a virtual reference station, the request including an indication of a desired location of the virtual reference station;
determining an entity that is associated to an area including the desired location; and
causing the request to be forwarded to the determined entity.
causing the request to be forwarded to the determined entity.

17. The computer readable storage medium according to claim 16, wherein the computer program code is associated to an area including the location and wherein the area to which the determined entity is associated is a sub-area of the area to which the computer program code is associated.

18. The computer readable storage medium according to claim 16, the computer program code further realizing the following when executed by a processor:
causing a transmission of access information for an entity, which is configured to provide virtual measurements on beacon signals that are valid for a virtual reference station in an area comprising the desired location, to a device from which the request originates.

19. The computer readable storage medium according to claim 16, wherein the requested virtual measurements on beacon signals comprise carrier-phase measurements on beacon signals.

20. An apparatus comprising:
means for receiving a request to provide virtual measurements on beacon signals that are valid for a virtual reference station, the request including an indication of a desired location of the virtual reference station;
means for determining an entity that is associated to an area including the desired location; and
means for causing the request to be forwarded to the determined entity.

21. A method comprising:
an apparatus providing to another apparatus access to a plurality of service providers, which offer virtual measurements on beacon signals that are valid for virtual reference stations, via a single access point, wherein the apparatus comprises a database storing information on the plurality of service providers, and wherein the apparatus searches the database for providing the access.

22. An apparatus comprising:
a database storing information on a plurality of service providers;
a processor; and
at least one memory including computer program code, the at least one memory and the computer program code configured to, with the processor, cause the apparatus at least to perform:
search the database for providing to another apparatus access to the plurality of service providers, which offer virtual measurements on beacon signals that are valid for virtual reference stations, via a single access point.

* * * * *

UNITED STATES PATENT AND TRADEMARK OFFICE
CERTIFICATE OF CORRECTION

| | | |
|---|---|---|
| PATENT NO. | : 8,078,192 B2 | Page 1 of 1 |
| APPLICATION NO. | : 12/148944 | |
| DATED | : December 13, 2011 | |
| INVENTOR(S) | : Wirola et al. | |

It is certified that error appears in the above-identified patent and that said Letters Patent is hereby corrected as shown below:

At column 16, lines 12 and 13 (claim 16, lines 12 and 13) please remove the second entry of the phrase "causing the request to be forwarded to the determined entity." as same has been entered twice.

Signed and Sealed this
Third Day of April, 2012

David J. Kappos
*Director of the United States Patent and Trademark Office*